United States Patent
Fukushima et al.

(10) Patent No.: US 7,249,650 B2
(45) Date of Patent: Jul. 31, 2007

(54) VEHICLE STEERING DEVICE

(75) Inventors: Noriyuki Fukushima, Tokyo (JP); Taiga Tamegai, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 173 days.

(21) Appl. No.: 11/129,870

(22) Filed: May 16, 2005

(65) Prior Publication Data

US 2005/0257985 A1    Nov. 24, 2005

(30) Foreign Application Priority Data

May 21, 2004  (JP)  ............................ 2004-152031
Jul. 13, 2004  (JP)  ............................ 2004-206084

(51) Int. Cl.
    *B62D 5/04*    (2006.01)
(52) U.S. Cl. ........................ 180/402; 701/41
(58) Field of Classification Search ................ 180/402; 701/41
    See application file for complete search history.

(56) References Cited

U.S. PATENT DOCUMENTS

| 5,944,137 A | 8/1999 | Moser et al. | |
|---|---|---|---|
| 6,041,882 A * | 3/2000 | Bohner et al. | 180/402 |
| 6,076,626 A * | 6/2000 | Bohner et al. | 180/402 |
| 6,082,482 A * | 7/2000 | Kato et al. | 180/402 |
| 6,554,094 B1 * | 4/2003 | Bell et al. | 180/402 |
| 6,698,542 B2 * | 3/2004 | Nishizaki et al. | 180/403 |
| 6,728,615 B1 * | 4/2004 | Yao et al. | 701/41 |
| 6,729,432 B1 * | 5/2004 | Yao et al. | 180/402 |
| 6,757,601 B1 * | 6/2004 | Yao et al. | 701/41 |
| 6,918,460 B2 * | 7/2005 | Tajima et al. | 180/402 |
| 6,991,061 B2 * | 1/2006 | Laurent | 180/402 |
| 7,191,864 B2 * | 3/2007 | Sugitani et al. | 180/402 |

FOREIGN PATENT DOCUMENTS

| DE | 100 46 167 | 5/2001 |
|---|---|---|
| DE | 100 46 524 | 4/2002 |
| JP | 2003-252223 | 9/2003 |

* cited by examiner

*Primary Examiner*—Tony H. Winner
(74) *Attorney, Agent, or Firm*—Brinks Hofer Gilson & Lione

(57) ABSTRACT

A vehicle steering device includes a steering shaft; a rotation operating member of the steering shaft; an operation-side motor that supplies an operating reaction force to the rotation operating member; a steering member; a steering-side motor that supplies an operating reaction force to the steering member; a steering angle detecting means that detects a steering angle; and a control means, an absolute angle detecting means is provided at the steering shaft, and a motor rotation angle detecting means is provided at a motor shaft of the operation-side motor.

5 Claims, 6 Drawing Sheets

VEHICLE STEERING DEVICE

This application claims the benefit of priority to Japanese Patent Application No. 2004-152031 filed on May 21, 2004 and 2004-206084 filed on Jul. 13, 2004, both herein incorporated by reference.

BACKGROUND OF THE INVENTION

1. Field of the Invention

The present invention relates to a vehicle steering device of a by-wire method, and more particularly, to means that makes smooth the control of driving for an operation-side motor, which supplies an operating reaction force to a rotation operating member.

2. Description of the Related Art

In the related art, a vehicle steering device of a mechanical method in which a steering shaft is connected with a steering member via a mechanical power transmission mechanism, has been used as a vehicle steering device. However, in recent years, a vehicle steering device of the by-wire method is proposed, which converts the rotation state of a steering shaft into electric signals, and controls the driving of a steering-side motor provided at a steering member based on the electric signals, and controls the driving of an operation-side motor that supplies an operating reaction force to a rotation operating member of the steering shaft, and supplies a desired operating reaction force to the rotation operating member.

FIG. 6 is a structure view showing an example of a vehicle steering device of the by-wire method, which has been conventionally proposed. The vehicle steering device includes a steering shaft 1; a rotation operating member 2 such as a steering wheel that is operated to rotate the steering shaft 1; an absolute operation angle detecting means 3, whose rotating portion is attached to the steering shaft 1, and which detects the absolute operation angle of the rotation operating member 2; an operation-side motor 4 that supplies an operating reaction force to the rotation operating member 2 via the steering shaft 1; a speed reduction mechanism 5 which is interposed between the steering shaft 1 and the operation-side motor 4 to reduce the operating reaction force generated at the operation-side motor 4 and to transmit it to the steering shaft 1; a steering shaft 7 provided at a transmission mechanism 6, a steering-side motor 8 that rotates the steering shaft 7; a steering angle detecting means 9 that detects a steering angle, and a control means 10 that generates driving signals M1 for the operation-side motor 4 and driving signals M2 for the steering-side motor 8 based on absolute operation angle signals θ1 outputted from the absolute operation angle detecting means 3 and steering angle signals θ2 outputted from the steering angle detecting means 9. Meanwhile, the transmission mechanism 6 is constituted with a pinion gear 11 fixed to the steering shaft 7, a rack shaft 12 having a rack gear engaging with the pinion gear 11, and a link mechanism 14 having an axle 13 driven by the rack gear 12 (for example, see Japanese Patent Unexamined Application Publication No. 2003-252223).

The control means 10 generates and outputs driving signals M1 for the operation-side motor 4 based on the absolute operation angle signals θ1 and the steering angle signals θ2. Therefore, like the vehicle steering device of the mechanical method, the rotation operating member 2 can be supplied with operating reaction force according to the operating angle and direction of the rotation operating member 2. Also, the control means 10 generates driving signals M2 for the steering-side motor 8 based on the absolute operation angle signals θ1 and the steering angle signals θ2, and outputs them. Therefore, like the vehicle steering member of the mechanical method, the steering member 6 can be steered in accordance with the operating angle and direction of the rotation operating member 2, and road state, etc.

However, in order to supply the rotation operating member 2 with smooth and continuous operating reaction force, that is, a force that does not cause a driver to feel uncomfortable in controlling the driving of the operation-side motor 4, it is required to control the driving smoothly or with high resolution. Also, in order to control the driving smoothly or with high resolution, a detecting means having high resolution is required.

However, the detecting means having high resolution enough to perform smooth driving control usually has a high price or a low durability, therefore, it is difficult to control the driving of the operation-side motor smoothly.

SUMMARY OF THE INVENTION

The present invention has been made to solve the above problems, and an object of the invention is to smoothly control the driving for the operation-side motor.

In order to solve the problem, a vehicle steering device according to an aspect of the present invention includes a rotation operating member that is operated to rotate the steering shaft; an absolute operation angle detecting means that detects an absolute operation angle of the rotation operating member; an operation-side motor that supplies an operating reaction force to the rotation operating member; a speed reduction mechanism interposed between a motor shaft of the operation-side motor and the steering shaft to reduce the rotation speed of the motor shaft and to transmit the reduced rotation to the steering shaft; a motor rotation angle detecting means provided at the motor shaft of the operation-side motor to detect the rotation angle of the operation-side motor; a steering-side motor that changes a steering angle via a transmission mechanism; a steering angle detecting means that detects the steering angle; and a control means that controls the driving of the steering-side motor based on the steering angle and the absolute operation angle of the rotation operating member, and also controls the driving of the steering-side motor based on the steering angle and the rotation angle of the operation-side motor.

If a rotation angle detecting means is provided at the motor shaft of the operation-side motor, the rotation speed of the rotation operating member is increased and transmitted to the motor shaft of the operation-side motor by the speed reduction mechanism provided between the steering shaft and the motor shaft. Therefore, high resolution absolute operation angle signals can be obtained without providing an angle detecting means having high resolution, and the driving of the operation-side motor can be controlled smoothly.

In addition, preferably, the absolute operation angle detecting means is independently provided to be driven directly by the steering shaft, not via the speed reduction mechanism, and the motor rotation angle detecting means is constituted with a relative rotation angle detecting means directly driven by the motor shaft and an absolute rotation angle computing means that computes the absolute rotation angle of the operation-side motor from the absolute operation angle of the rotation operating member and the relative rotation angle of the operation-side motor, and the control means controls the driving of the operation-side motor based on the absolute rotation angle.

In order to compute the absolute rotation angle of the operation-side motor, a reference rotation angle as well as the relative rotation angle is required. However, the absolute operation angle of the rotation operating member is used as the reference operation angle without providing a reference rotation angle detecting means. Therefore, the absolute rotation angle detecting means can be omitted, and the cost of the vehicle steering device can be decreased.

Also, preferably, the control means controls the driving of the steering-side motor by using the rotation angle of the operation-side motor as the absolute operation angle, and the motor rotation angle detecting means also functions as the absolute operation angle detecting means.

It is not necessary to provide a separate absolute operation angle means that detects the absolute operation angle of the rotation operating member. Therefore, the cost of the vehicle steering device can be decreased.

In addition, preferably, the vehicle steering device according to the aspect of the present invention includes a signal converting means that converts rotation angle signals outputted from the motor rotation angle detecting means into signals of a type that the control means requires, and then supplies them to the control means.

Also, preferably, the vehicle steering device according to the aspect of the present invention includes a signal converting means that converts the driving signals for the operation-side motor outputted from the control means into signals of a type that the operation-side motor requires, and then transmits them to the operation-side motor.

Various control means that processes different types of signals according to vehicle manufactures or vehicle types etc. can be provided to vehicles. In the related art, respective vehicle steering devices fit to control means are manufactured by different vehicle steering device manufacturers. In this case, the manufacturing line becomes complicated, and the cost of the vehicle steering device becomes high. Contrary to this, when a signal converting means that converts the operation angle signals outputted from the operation angle detecting means into signals of a type that the control means requires, and then transmits them to the control means, and converts the driving signals for the operation-side motor outputted from the control means into signals of a type that the operation-side motor requires, and then transmits them to the operation-side motor, the operation angle detecting means, the operation-side motor and the control means can be shared. Therefore, the vehicle steering cost can be decreased.

According to the aspect of the present invention, when the motor rotation angle detecting means is provided at the motor shaft of the operation-side motor, the rotation speed of the rotation operating member is increased by the speed reduction mechanism provided between the steering shaft and the motor shaft, and then transmitted to the motor shaft of the operation-side motor. Therefore, high resolution absolute operation angle signals can be obtained without providing an angle detecting means having high resolution, and the driving of the operation-side motor can be controlled smoothly.

DESCRIPTION OF THE PREFERRED EMBODIMENTS

Figure 1:
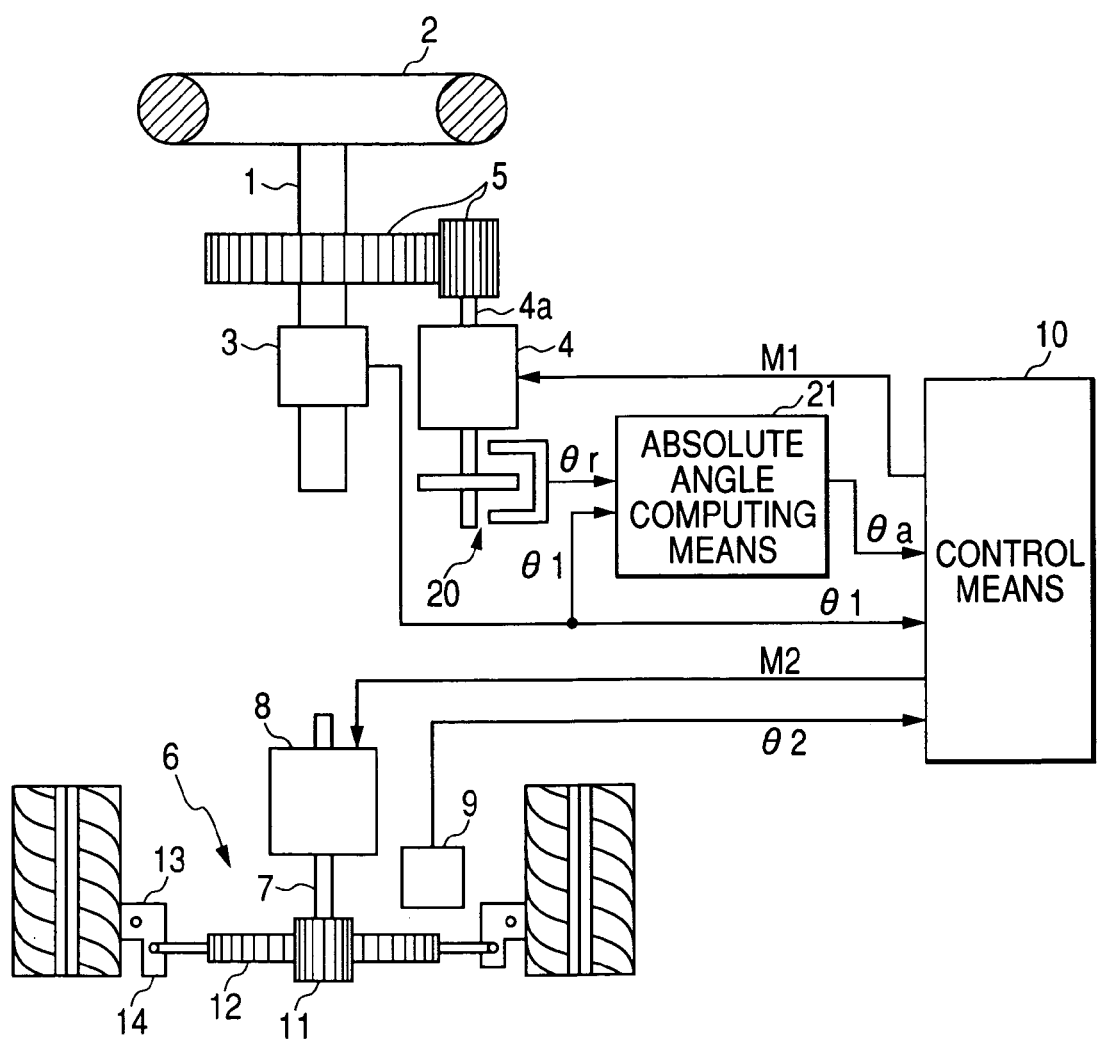
FIG. 1 illustrates the structure of a vehicle steering device according to an embodiment.
Figure 2:
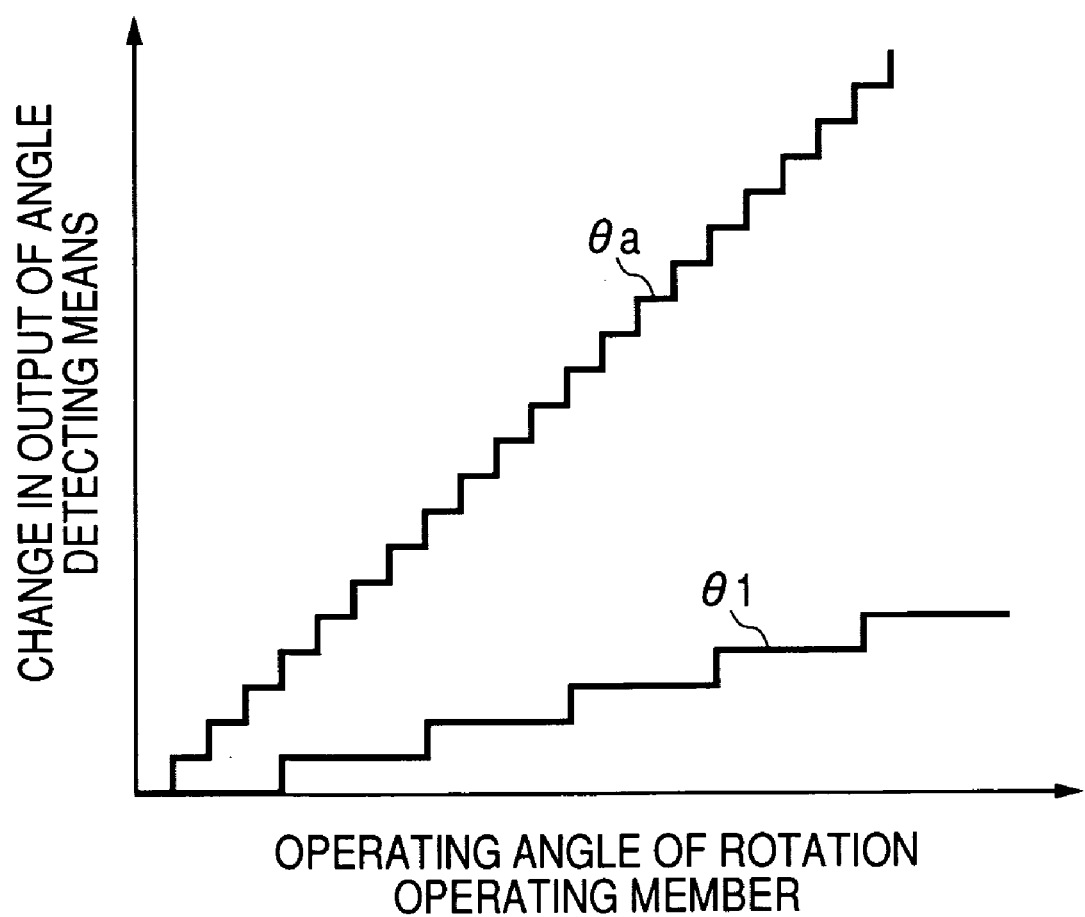
FIG. 2 is a graph comparing the output characteristics of a motor rotation angle detecting means with the output characteristics of an absolute operation angle detecting means.
Figure 3:
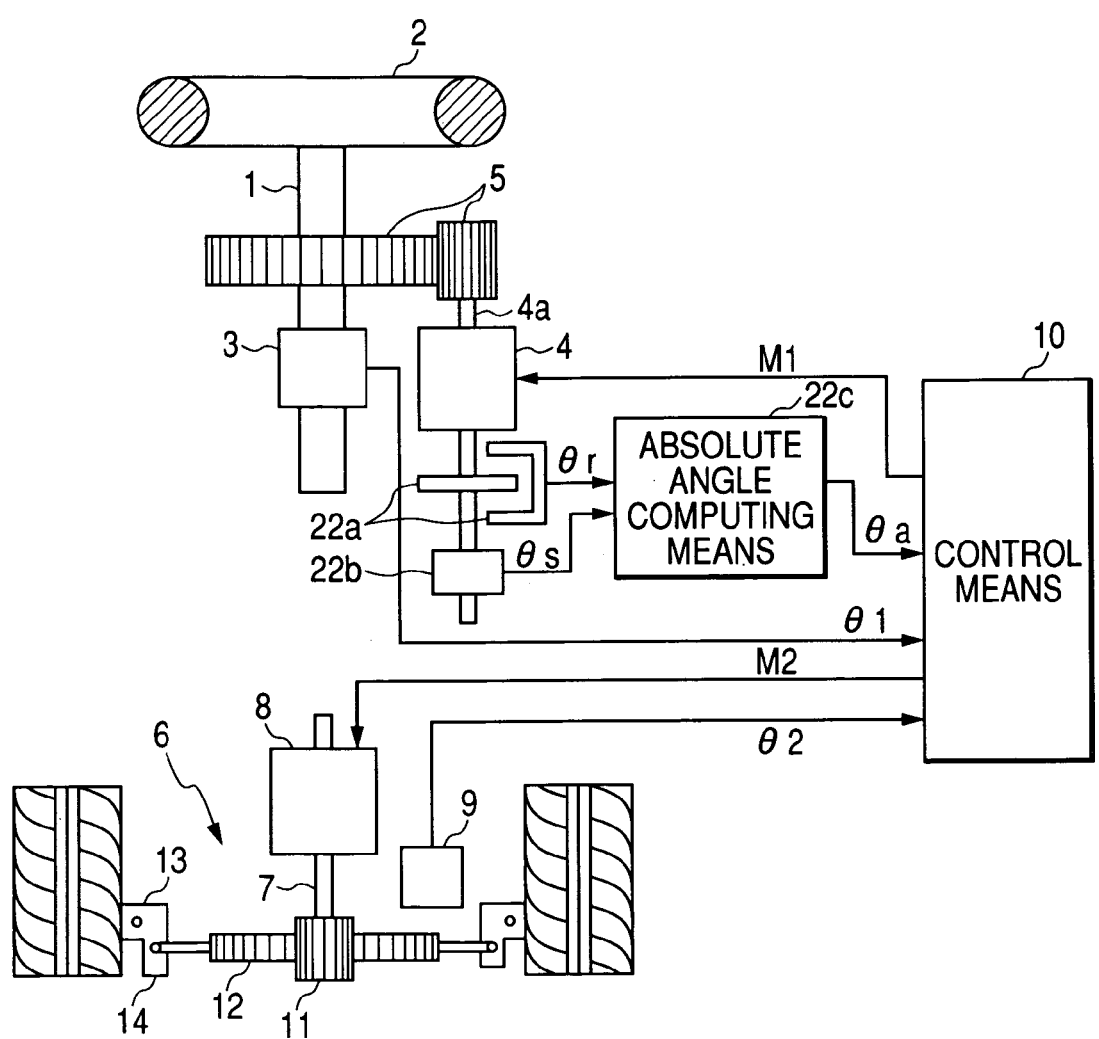
FIG. 3 illustrates the structure of a vehicle steering device according to a second embodiment.
Figure 4:
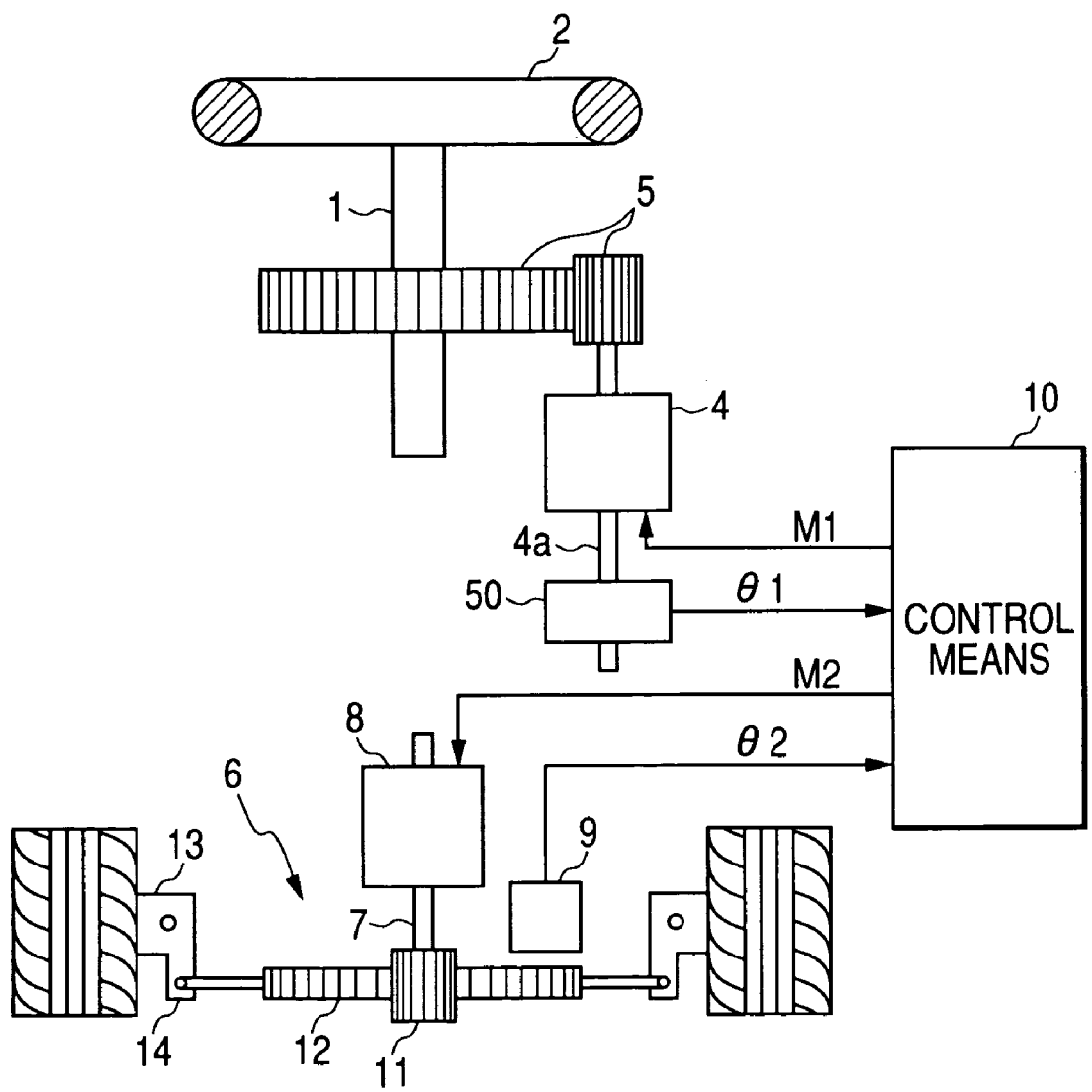
FIG. 4 illustrates the structure of a vehicle steering device according to a third embodiment.
Figure 5:
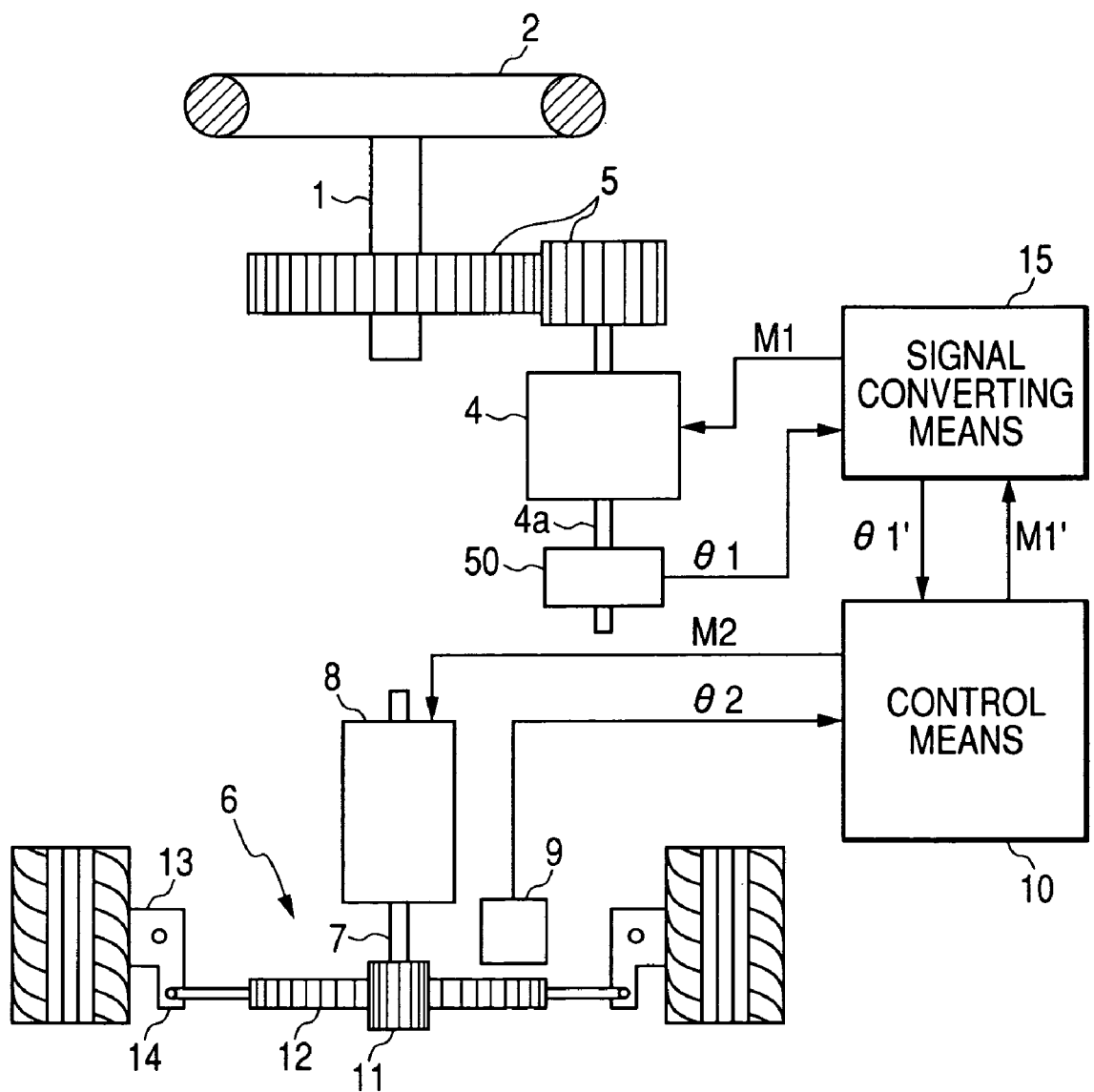
FIG. 5 illustrates the structure of a vehicle steering device according to a fourth embodiment.

Hereinafter, preferred embodiments of a vehicle steering device according to the present invention will be described with reference to FIGS. 1 to 5. FIG. 1 illustrates the structure of a vehicle steering device according to a first embodiment, and FIG. 2 is a graph comparing the output characteristics of a motor rotation angle detecting means with the output characteristics of an absolute operation angle detecting means, and FIG. 3 illustrates the structure of a vehicle steering device according to a second embodiment. FIG. 4 illustrates the structure of a vehicle steering device according to a third embodiment. FIG. 5 illustrates the structure of a vehicle steering device according to a fourth embodiment.

Figure 6:
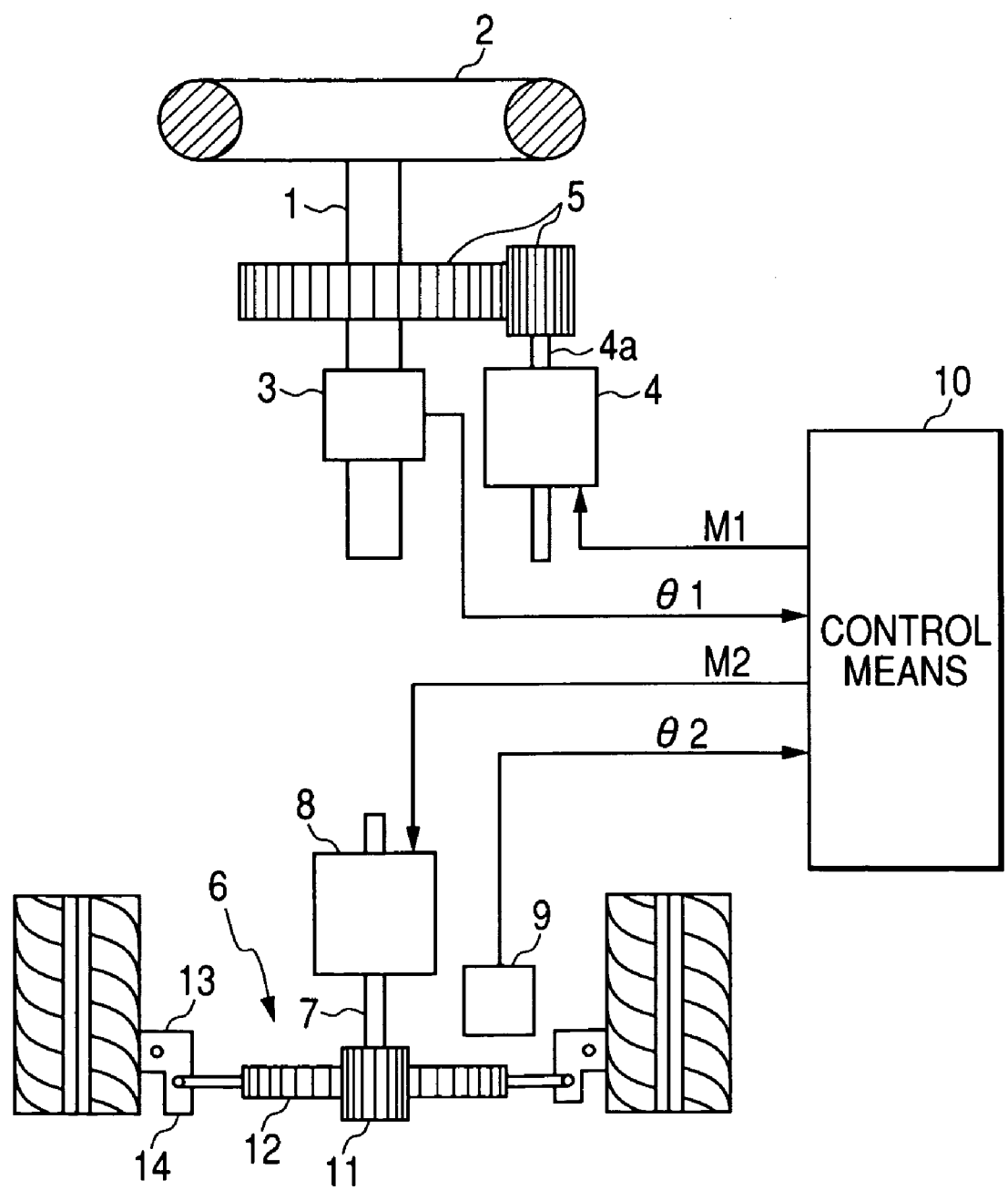
FIG. 6 illustrates the structure of a vehicle steering device in the related art.

As can be apparent from the comparison between FIG. 1 and FIG. 6, the vehicle steering device according to the first embodiment further includes a motor rotation angle detecting means 20 that detects the motor rotation angle of an operation-side motor 4 and an absolute angle computing means 21 that computes an absolute motor rotation angle signal $\theta a$ for the operation-side motor 4 based on a motor rotation angle signal $\theta r$ of the operation-side motor 4 outputted from the motor rotation angle detecting means 20 and an absolute operation angle signal $\theta 1$ of a rotation operating member 2 outputted from an absolute operation angle detecting means 3 comparing with a vehicle steering device in the related art shown in FIG. 6.

The other parts except the above are the same as those of the vehicle steering device in the related art shown in FIG. 6, that is, the reference numeral 1 represents a steering shaft, the reference numeral 2 represents a rotation operating member, the reference numeral 3 represents an absolute operation angle detecting means, the reference numeral 4 represents an operation-side motor, the reference numeral 5 represents a speed reduction mechanism, the reference numeral 6 represents a steering member, the reference numeral 7 represents a steering shaft, the reference numeral 8 represents a steering-side motor, the reference numeral 9 represents a steering angle detecting means, and the reference numeral 10 represents a control means. Also, the steering member 6 is constituted with a pinion gear 11 fixed to the steering shaft 7, a rack shaft 12 having a rack gear that engages the pinion gear 11, and a link mechanism 14 including an axle 13 driven by the rack shaft 12.

As the absolute operation angle detecting means 3, a digital encoder, an analog potentiometer or the like that detects the absolute rotation angle of the steering shaft 1 can be used. When an encoder is used as the absolute operation angle detecting means 3, for example, a code plate on which a code pattern is formed is attached to the steering shaft 1, and when a potentiometer is used as the absolute operation angle detecting means 3, for example, a resistive substrate on which a resistive pattern is formed or a rotary plate to which a slider is attached is attached to the steering shaft 1.

Contrary to this, in this embodiment, a digital encoder that detects the relative motor rotation angle of the operation-side motor 4 is used as the motor rotation angle detecting means 20. The code plate on which a code pattern is formed is attached to the motor shaft 4a of the operation-side motor 4.

The absolute angle computing means 21 computes the absolute rotation angle θa by adding or subtracting the relative rotation angle signal θr of the operation-side motor 4 outputted from the motor rotation angle detecting means 20 to or from a reference rotation angle, which is the absolute operation angle signal θ1 of the rotation operating member 2 outputted from the absolute operation angle means 3 when an ignition switch is turned on.

The control means 10 generates driving signals M1 for the operation-side motor 4 based on the absolute rotation angle θa outputted from the absolute angle computing means 21 and the steering angle signals θ2 outputted from the steering angle detecting means 9, and controls the driving of the operation-side motor 4. Also, it generates driving signals M2 for the steering-side motor 8 based on the absolute operation angle signal θ1 of the rotation operating member 2 outputted from the absolute operation angle detecting means 3 and the steering angle signals θ2 outputted from the steering angle detecting means 8, and controls the driving of the steering-side motor 8.

Since the speed reduction mechanism 5 interposed between the steering shaft 1 and the operation-side motor 4 reduces an operating reaction force generated at the operation-side motor 4, and then transmits it to the steering shaft 1, the speed reduction mechanism 5 acts as a speed increase mechanism for the motor rotation angle detecting means 20 when the rotating portion of the rotation angle detecting means 20 is coupled with the motor shaft 4a of the operation-side motor 4. Therefore, when the motor rotation angle detecting means 20 is an encoder, the number of the codes of the motor rotation angle signals θ$_r$ to the unit rotation angle of the rotation operating member 2 increases as much as the speed increase ratio of the speed reduction mechanism 5 more than the number of the codes of the operation angle signals θ1. Therefore, if the control means 10 generates driving signals M1 for the motor of operation 4 based on the absolute rotation angle θa outputted from the absolute angle computing means 21, the driving of the operation-side motor 4 can be controlled with high resolution, that is, more smoothly as compared with the case where the control means 10 generates driving signals M1 for the motor of operation 4 based on the absolute operation angle signals θ1 of the rotation operating member 2 outputted from the absolute operation angle detecting means 3. Thus an operating reaction force, which is smooth and continuous, not causing a driver to feel uncomfortable, can be provided to the rotation operating member 2.

Also, since the absolute operation angle signals θ1 outputted from the absolute operation angle detecting means 3 is used as the reference rotation angle for computing the absolute rotation angle θa of the operation-side motor 4, an additional detecting means is not required to detect the reference rotation angle, and the increase of the cost of the vehicle steering device can be suppressed.

Meanwhile, in the first embodiment, only a relative rotation angle detecting means is provided in the motor shaft 4a of the operation-side motor 4, however, as shown in a second embodiment of FIG. 3, an absolute angle detecting means constituted with a reference angle detecting means 22b and an absolute rotation angle computing means 22c as well as the relative rotation angle detecting means 22a can be provided in the motor shaft 4a of the operation-side motor 4. Also, it is possible to use only an analog potentiometer as the absolute angle detecting means.

In addition, in the first embodiment, the rotating portion of the motor rotation angle detecting means 20 is directly attached to the motor shaft 4a of the operation-side motor 4, however, a transmission mechanism constituted with the combination of a large gear attached to the motor shaft 4a and a small gear attached to the rotating portion can be provided additionally between the rotating portion of the motor rotation angle detecting means 20 and the motor shaft 4a of the operation-side motor 4.

FIG. 4 shows the structure of a vehicle steering device according to a third embodiment. The vehicle steering device includes a steering shaft 1, a rotation operating member 2, a combined rotation angle detecting means and an absolute operation angle detecting means 50, an operation-side motor 4, a speed reduction mechanism 5, a steering member 6, a steering shaft of an axle 7, a steering-side motor 8, a steering angle detecting means 9 and a control means 10. The steering member 6 is constituted with a pinion gear 11 fixed to the steering shaft 7, a rack shaft 12 having a rack gear engaging with the pinion gear 11 and a link mechanism 14 having an axle 13 driven by the rack shaft 12.

The steering device of the embodiment is characterized in that the motor rotation angle detecting means also functions as an absolute operation angle detecting means. In addition, as the combined motor operation angle detecting means and absolute operation angle detecting means 50, a digital encoder, an analog potentiometer or the like can be used. When an encoder is used as the combined motor operation angle detecting means and absolute operation angle detecting means 50, a code plate on which a code pattern is formed is attached to the motor shaft 4a of the operation-side motor 4, and when a potentiometer is used as the combined motor operation angle detecting means and absolute operation angle detecting means 50, a resistive substrate on which a resistive pattern is formed or a rotary plate to which a slider is attached is attached to the motor shaft 4a of the operation-side motor 4.

As described above, since the speed reduction mechanism 5 interposed between the steering shaft 1 and the operation-side motor 4 reduces an operating reaction force generated at the operation-side motor 4, and then transmits it to the steering shaft 1, the speed reduction mechanism 5 acts as a speed increase mechanism to the combined motor operation angle detecting means and absolute operation angle detecting means 50 when the rotating portion of the combined motor operation angle detecting means and absolute operation angle detecting means 50 is coupled with the motor shaft 4a of the operation-side motor 4. Therefore, when the combined motor operation angle detecting means and absolute operation angle detecting means 50 is a potentiometer, the changing amount of the absolute operation angle signals θ1 to the unit rotation angle of the rotation operating member 2 in the vehicle steering device according to the embodiment increases as much as the speed increase ratio of the speed reduction mechanism 5 more than that of the vehicle steering device in the related art, in which the rotating portion of the absolute operation angle detecting means 3 is attached to the steering shaft 1. In addition, when the combined motor operation angle detecting means and absolute operation angle detecting means 50 is an encoder, as shown in FIG. 2, the number of the codes of the absolute operation angle signals θ1 to the unit rotation angle of the rotation operating member 2 increases as much as the speed increase ratio of the speed reduction mechanism 5. Therefore, the driving of the operation-side motor 4 can be controlled with high resolution, that is, more smoothly. Thus an operating reaction force, which is smooth and continuous, not causing a driver to feel uncomfortable, can be provided to the rotation operating member 2.

In addition, in this embodiment, the control means 10 controls the driving of the steering-side motor 8 using the rotation angle of the operation-side motor 4 as the absolute operation angle of the rotation operating member 2, and the motor rotation angle detecting means also functions as the absolute operation angle detecting means that detects the absolute steering angle of the rotation operating member 2. Therefore, it is not required to provide an absolute operation angle detecting means that detects an absolute operation angle of the rotation operating member 2, and the cost of the vehicle steering device can be decreased.

Next, a vehicle steering device according to a fourth embodiment of the present invention will be described with reference to FIG. 5.

As shown in FIG. 5, the vehicle steering device is characterized by having a signal converting means between the combined motor operation angle detecting means and absolute operation angle detecting means 50 and the operation-side motor 4, and the control means 10, which converts the absolute operation angle signals θ1 outputted from the combined motor operation angle detecting means and absolute operation angle detecting means 50 into the absolute operation angle signals θ1' of a type that the control means 10 requires, and then transmits it to the control means 10, and converts the driving signals M1' for the operation-side motor 4 outputted from the control means 10 into the driving signals M1 of a type that the operation-side motor 4 requires, and then transmits them to the operation-side motor 4.

For example, when a device that outputs digital signals such as an encoder and the like is provided as the combined motor operation angle detecting means and absolute operation angle detecting means 50, and a device that requires the input of analog signals is provided as the control means, the signal converting means 15 converts digital absolute operation angle signals θ1 into analog absolute operation angle signals θ1', and then transmits them to the control means 10. Also, when a device having a low resolution is provided as the combined motor operation angle detecting means and absolute operation angle detecting means 50, and a device that requires the input of high resolution signals is provided as the control means, the signal converting means 15 convert low resolution signals θ1 into high resolution signals θ1', and then transmits them to the control means 10. Further, when a small-sized motor having a low rated current is provided as the operation-side motor 4, and a device that outputs motor driving signals fit to a large-sized motor having a large rated current is provided as the control means, the signal converting means 15 converts large electric power signals M1' into small electric power signals M1, and then transmits them to the operation-side motor 4. Even when the combined motor operation angle detecting means and absolute operation angle detecting means 50, the operation-side motor 4 and the control means 10 have a reverse relationship to the above, the signal converting means 15 converts signals.

As described above, since the vehicle steering device of the embodiment includes the signal converting means 15, which converts the absolute operation angle signals θ1 outputted from the combined motor operation angle detecting means and absolute operation angle detecting means 50 into the absolute operation angle signals θ1' of a type that the control means 10 requires, and then transmits it to the control means 10, and converts the driving signals M1' for the operation-side motor 4 outputted from the control means 10 into the driving signals M1 of a type that the operation-side motor 4 requires, and then transmits them to the operation-side motor 4, the combined motor operation angle detecting means and absolute operation angle detecting means 50, the operation-side motor 4 and the control means 10 can be shared. Therefore, the cost of the vehicle steering device can be decreased.

That invention claimed is:

1. A vehicle steering device comprising:
   a rotation operating member that is operated to rotate a steering shaft;
   an absolute operation angle detecting means that detects an absolute operation angle of the rotation operating member;
   an operation-side motor that supplies an operating reaction force to the rotation operating member;
   a speed reduction mechanism interposed between a motor shaft of the operation-side motor and the steering shaft to reduce a rotation speed of the motor shaft and to transmit a reduced rotation to the steering shaft;
   a motor rotation angle detecting means provided at the motor shaft of the operation-side motor to detect a rotation angle of the operation-side motor;
   a steering-side motor that changes a steering angle via a transmission mechanism;
   a steering angle detecting means that detects the steering angle; and
   a control means that controls driving of the steering-side motor based on the steering angle and the absolute operation angle of the rotation operating member, and that controls driving of the operation-side motor based on the steering angle and the rotation angle of the operation-side motor.

2. The vehicle steering device according to claim 1, wherein the absolute operation angle detecting means is independently provided to be driven directly by the steering shaft, not via the speed reduction mechanism, and the motor rotation angle detecting means is constituted with a relative rotation angle detecting means directly driven by the motor shaft and an absolute rotation angle computing means that computes the absolute rotation angle of the operation-side motor from the absolute operation angle of the rotation operating member and a relative rotation angle of the operation-side motor, and the control means controls the driving of the operation-side motor based on the absolute rotation angle.

3. The vehicle steering device according to claim 1, wherein the control means controls the driving of the steering-side motor by using the rotation angle of the operation-side motor as the absolute operation angle, and the motor rotation angle detecting means also functions as the absolute operation angle detecting means.

4. The vehicle steering device according to claim 1, further comprising:
   a signal converting means that converts rotation angle signals outputted from the motor rotation angle detecting means into signals that are recognizable to the control means, and supplies the signals to the control means.

5. The vehicle steering device according to claim 1, further comprising:
   a signal converting means that converts driving signals for the operation-side motor outputted from the control means into signals that are recognizable to the operation-side motor, and supplies the signals to the operation-side motor.

* * * * *